US008811596B2

(12) United States Patent
Arnold et al.

(10) Patent No.: US 8,811,596 B2
(45) Date of Patent: *Aug. 19, 2014

(54) APPARATUS INCLUDING ASSOCIATIVE MEMORY FOR EVALUATING AUDIO COMMUNICATIONS

(75) Inventors: William G. Arnold, Seattle, WA (US); Leonard J. Quadracci, Seattle, WA (US)

(73) Assignee: The Boeing Company, Chicago, IL (US)

( * ) Notice: Subject to any disclaimer, the term of this patent is extended or adjusted under 35 U.S.C. 154(b) by 274 days.

This patent is subject to a terminal disclaimer.

(21) Appl. No.: 11/767,840

(22) Filed: Jun. 25, 2007

(65) Prior Publication Data

US 2008/0320042 A1 Dec. 25, 2008

(51) Int. Cl.
*G06F 17/00* (2006.01)
*G06F 17/30* (2006.01)
*G10L 15/08* (2006.01)
*G10L 15/26* (2006.01)

(52) U.S. Cl.
CPC ........ *G10L 15/265* (2013.01); *G06F 17/30746* (2013.01)
USPC ....................... 379/265.13; 704/251; 707/750

(58) Field of Classification Search
USPC ......... 707/771, 688, 730, 731, 749, 750, 758, 707/776; 704/243, 245, 251, 231, 252, 263; 379/265.01, 265.13, 266.07
See application file for complete search history.

(56) References Cited

U.S. PATENT DOCUMENTS

| 6,973,428 | B2 * | 12/2005 | Boguraev et al. ............. 704/251 |
| 2005/0105712 | A1 | 5/2005 | Williams et al. |
| 2005/0114133 | A1 | 5/2005 | Mark et al. |
| 2005/0238161 | A1 * | 10/2005 | Yacoub et al. ........... 379/265.06 |
| 2005/0283475 | A1 | 12/2005 | Beranek et al. |
| 2006/0233121 | A1 * | 10/2006 | Cooper ........................ 370/261 |
| 2006/0233347 | A1 | 10/2006 | Tong et al. |
| 2007/0083370 | A1 | 4/2007 | Scarano et al. |
| 2007/0123223 | A1 * | 5/2007 | Letourneau et al. ....... 455/414.1 |
| 2007/0162283 | A1 * | 7/2007 | Petrushin ...................... 704/255 |

FOREIGN PATENT DOCUMENTS

CA  2564760 A1  2/2007

OTHER PUBLICATIONS

U.S. Appl. No. 11/670,210, filed Feb. 1, 2007; assigned to Assignee of the present application.
Great Britain Intellectual Property Office, Combined Search and Examination Report of Oct. 31, 2008 re: Application GB0811670.9.
UK Examination Report under Section 18(3); Jul. 6, 2010.

* cited by examiner

*Primary Examiner* — Marc Filipczyk

(57) ABSTRACT

An apparatus for evaluating an audio communication comprises a data store for storing a plurality of digital units representing a plurality of characterized aspects of historical audio communications. The characterized aspects include words and sets of words. The apparatus further comprises an associative memory unit coupled with the data store to create associations between entities representing the characterized aspects, and relate the entities and the frequency of occurrence of the entities to identify relationships with call handling categories and priorities requiring intervention, and an assessing unit coupled with the associative memory unit to indicate whether the audio communication contains any associative memory associations related to a call handling category and call handling priority requiring intervention.

2 Claims, 2 Drawing Sheets

APPARATUS INCLUDING ASSOCIATIVE MEMORY FOR EVALUATING AUDIO COMMUNICATIONS

TECHNICAL AREA

The present invention is directed to uses of data devices that are useful for identifying associative memory relations among data entries, and especially to using such associative memory capable data devices in evaluating audio communications.

BACKGROUND

Managers of activities such as, by way of example and not by way of limitation, call center activities which receive a high volume of voice calls may face a continual challenge to extract actionable information from large volumes of voice communications traffic. Such call center activities may include, by way of further example and not by way of limitation, retail customer service call centers, national or regional call centers related to customer-service industry businesses, or governmental agencies involved in intelligence-gathering activity. Call center activities may receive a vast number of calls that contain huge amounts of potentially important and actionable data. These activities do not currently have a way to easily identify types of calls that require timely notification of managers. Typical call center employees or supervisors may be unable to timely present critical voice call categorization data to managers because (1) too many calls containing too much data preclude rapid analysis of which calls are of immediate importance and which calls can be recorded for later handling, (2) call specifics are incomplete or not understandable and indicators such as tone or voice speed are available but are difficult to characterize, or (3) voice patterns or language in the voice call that relate to management priorities are not easy to identify.

There is a need for an apparatus and method for evaluating audio communications that can enhance pattern recognition and other historical perspective understanding of call contents to permit improved call handling.

DETAILED DESCRIPTION

Associative memory learning technology may provide a new methodology for categorizing and prioritizing audio segments in commercial and governmental applications. This technology may be applicable to a situation in which a high volume of calls must be processed rapidly to allow efficient and appropriate action by managers responsible for acting upon the information included in those calls. The technology may use historical intelligence data and information for categorizing and prioritizing information included in audio segments received in the calls.

Figure 1:
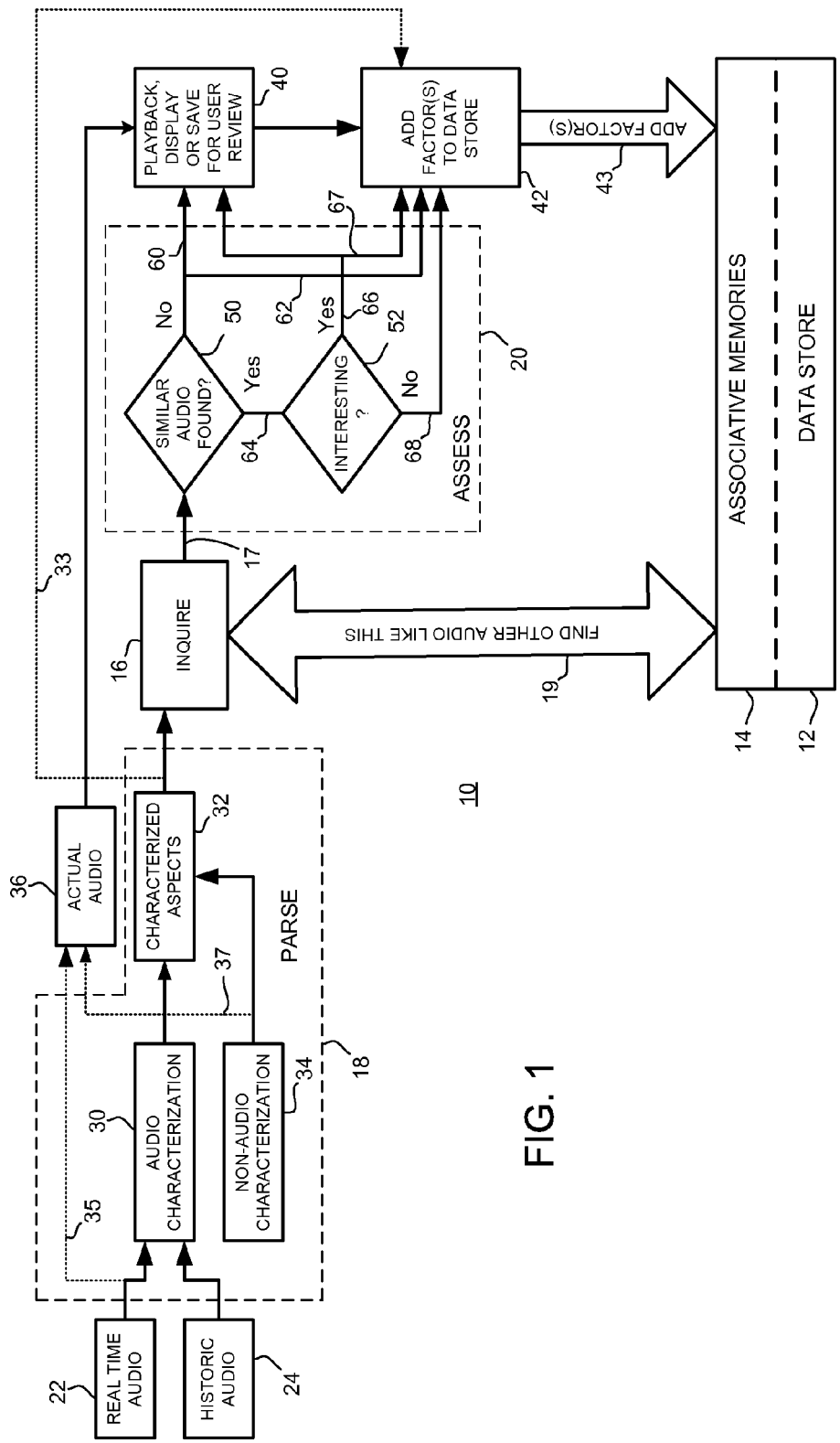
FIG. 1 is a schematic illustration of an embodiment of the invention.

FIG. 1 is a schematic illustration of an embodiment of the invention. In FIG. 1, an apparatus 10 may include a data store 12 coupled with an associative memory unit 14. Data store 12 and associative memory unit 14 may be embodied in a single unitary device. Apparatus 10 may also include a query unit 16 coupled with at least one of data store 12 and associative memory unit 14. A parsing unit 18 may be coupled with query unit 16. An assessing unit 20 may be coupled with query unit 16 and coupled with at least one of data store 12 and associative memory unit 14.

A user review unit 40 may be coupled with assessing unit 20 for providing playback, display or another medium for reviewing audio signals for a user's evaluation of audio signals. User review unit 40 may save audio signals for later evaluation or analysis by a user. User review unit 40 may provide factors selected by a user or according to at least one predetermined criterion for provision to an input unit 42. Input unit 42 may provide selected factors relating to audio signals received at audio input units 22, 24 or otherwise received by apparatus 10, as indicated by an arrow 43. Other ways of receiving audio signals may include, by way of example and not by way of limitation, on-line or off-line transmissions of audio signal-related information to apparatus 10 from another source such as, by way of example and not by way of limitation, radio reception, storage media or other signal transfer means or signal storage media.

Parsing unit 18 may include an audio characterization unit 30 coupled for receiving real time audio inputs from an audio source 22. Audio characterization unit 30 may also be coupled for receiving historic audio inputs from an archival or historic audio source 24. Audio characterization unit 30 may treat audio inputs received from audio sources 22, 24 to parse the received inputs to identify, quantify, digitally encode or otherwise treat aspects of those inputs so as to present a set of characterized aspects 32 for use by query unit 16. Audio characterized aspects may include, by way of example and not by way of limitation, representations of words, phrases, tone, speech cadence, speech continuity or hesitations, background noises, transmission noises or other aspects of the spoken or other audio input received from either of audio sources 22, 24.

A non-audio characterization unit 34 may also be included in parsing unit 18. Non-audio characterization unit 34 may treat non-audio factors associated with audio inputs received from audio sources 22, 24. Non-audio factors may be parsed by non-audio characterization unit 34 to identify, quantify, digitally encode or otherwise treat aspects of those non-audio factors for inclusion in the set of characterized aspects 32 for querying by query unit 16. Non-audio characterized aspects may include, by way of example and not by way of limitation, time of day, originating phone number, weather, identity or other information related with a speaker originating an audio input, other parties on the line and other aspects related to audio inputs received from either of audio sources 22, 24. For purposes of this disclosure, term "parse" may be taken to mean, "to examine closely or subject to detailed analysis, especially by breaking up in to components; to analyze or separate into more easily processed components".

Audio inputs may be received from any audio originator via any audio transmission method or device. By way of example and not by way of limitation, audio inputs received from audio sources 22, 24 may be analog or digital and may be provided live, via telephone, via radio, in audio files received via e-mail, streaming media data, in compact disc (CD) or digital versatile disc (DVD) recordings of voice messages, in taped voice recordings, in recorded or live music, in recorded or live continuous wave (CW) messages (e.g., in Morse Code) or any other audio signal provided in real time or reproduced by some mechanism. Further, the audio signals may be encoded, decoded, compressed, or decompressed according to various accepted standards or codecs.

Actual or real-time audio aspects may be provided directly from audio source 22 to an actual audio provision unit 36. Actual audio provision unit 36 may be coupled for providing actual audio information to user review unit 40. Non-audio characterization unit 34 may provide non-audio related information aspects to actual audio provision unit 36 for use by user review unit 40. The alternate nature of whether audio information may be provided directly from audio source 22 to actual audio provision unit 36 is indicated by presenting line 35 in a dotted line format. The alternate nature of whether non-audio information may be provided from non-audio characterization unit 34 to actual audio provision unit 36 is indicated by presenting line 37 in a dotted line format.

Query unit 16 may inquire of the set of characterized aspects 32 and of at least one of data store 12 and associative memory unit 14 to develop at least one query result for presentation at an output locus 17. Queries posed by query unit 16 may relate to characterized aspects or other information presented from the set of characterized aspects 32. Query unit 16 may inquire of one or both of data store 12 and associative memory unit 14 to seek other audio communications similar to the extant audio communications represented by the set of characterized aspects 32 or some subset of the set of characterized aspects 32, as represented by an arrow 19. A result of the inquiry to at least one of data store 12 and associative memory unit 14 is presented as at least one query result presented at output locus 17. One may recall that a query result may include a "no return" result in which no information is forthcoming as a result of the posed at least one query.

Assessing unit 20 may include a logical query unit 50 and a logical query unit 52. Logical query unit 50 may be coupled to receive the at least one query result presented at output locus 17 to pose the query whether the at least one query result indicates that similar audio information has been found before. If no similar audio information has been found before, logical query unit 50 may provide an indication of that information to user review unit 40 and to input unit 42 via a NO response line 60. Logical query unit 50 may also provide an indication or factors relating to that information to input unit 42 via a line 62 for further provision of the indication of the information to at least one of data store 12 and associative memory unit 14. If similar audio information has been found before, logical query unit 50 may provide an indication of that information to logical query unit 52 via a YES response line 64.

Logical query unit 52 may query whether the at least one query result is interesting, as defined by predetermined criteria. If the at least one query result is deemed interesting, logical query unit 52 may provide an indication of that information to user review unit 40 and to input unit 42 via a YES response line 60. Logical query unit 52 may also provide an indication or factors relating to that information to input unit 42 via a line 67 for further provision of the indication of the information to at least one of data store 12 and associative memory unit 14. If the at least one query result is not deemed interesting, logical query unit 52 may provide an indication of that information to input unit 42 via a NO response line 68 for further provision of the indication of the information to at least one of data store 12 and associative memory unit 14.

Characterized aspects relating to audio communications may be presented directly from the set of characterized aspects 32 to input unit 42 via a line 33 for further provision of the characterized aspects to at least one of data store 12 and associative memory unit 14. The alternate nature of whether characterized aspects may be provided directly from the set of characterized aspects 32 to input unit 42 is indicated by line 33 being presented in a dotted line format.

Apparatus 10 may decompose audio segment free text received at audio sources 22, 24 and establish associations between audio communication aspects within a single call and free text elements associated with other calls in a historical memory saved in data store 12. Associations may be ascertained between words or sets of words by associative memory unit 14 in cooperation with data store 12, and associations may be established as indicators of communication category or priority according to predetermined criteria. Apparatus 10 may derive relationships among decomposed audio segments to establish relationships between the decomposed audio segments and historical or otherwise identified elements that are not simple to establish simply by listening to audio communications.

A significant amount of specialized training may be required to prepare personnel to effectively categorize voice calls by listening to the calls. The training may be man-hour intensive and costly because of the use of call sharing of active or recorded calls as the principal effective training methodology. In contrast, use of associative memory techniques for categorizing voice communications may permit direct intervention by a local manager to tailor a communication system to specific requirements. By way of example and not by way of limitation, a manager may teach the system certain word patterns, tones, key words or word-location combinations as keys to requiring manager intervention.

Apparatus 10 may be advantageously employed to permit providing of examples of the kinds of voice communications that a user may wish categorized as requiring intervention. Specific types of exemplary voice communications may vary from situation to situation or may vary from business to business. By way of example and not by way of limitation, specific subjects, words, phrases or intonations key to a particular business may be identified by an installation including apparatus 10 as a learning agent. An apparatus 10 thus specifically "taught" may permit a manager merely to have query unit 16 inquire to the effect that data store 10 and associative memory unit 14 cooperate to respond by identifying audio segments "like this" (i.e., similar to an extant audio communication represented by the set of characterized aspects 32) for treatment in a particular way.

Employing data store 10 in cooperation with associative memory unit 14 may facilitate searching large sets of data regarding potential voice communications content and identifying recurring patterns, key words or phrases, key mood indicators and other pre-identified characteristics. Apparatus 10 may further facilitate comparison of those pre-identified characteristics or indicators to a voice communication in real time or near-real time. Apparatus 10 may further facilitate parsing free text representing a voice communication to identify commonalities Apparatus 10 may further facilitate identifying new patterns so that an audio communication may be categorized to facilitate so that future messages or past messages of that category may be accurately recognized. Apparatus 10 may thereby continue to learn over time and become a better tool or better adjust to changing conditions, such as changing business conditions.

By way of example and not by way of limitation, apparatus 10 may be advantageously employed to maximize opportunities for using audio segment categorization in applications including customer service phone operations; open mike on video cameras monitoring cash wrap operations; and customer service representatives on store floors with two-way, open mike capability. By way of further example and not by way of limitation, apparatus 10 may also permit categorizing recorded audio communication segments for later action to permit follow-up to customer queries, input to employee training or corrective action or input to potential employee awards.

Apparatus 10 may establish non-obvious relationships between words or phrases in a call, or between words and intonations, or between multiple words or phrases, to identify probable meanings and relationships with pre-identified critical categories requiring manager intervention. Such capabilities may result in opportunities for managers to intervene as critical situations are developing in order to preventively influence the course of events. Governmental agencies and businesses or corporations may deal with a large quantity and high frequency of recorded voice messages. It may be critical that those messages be rapidly analyzed to categorize the true message as opposed to the apparent message in order to quickly determine courses of action.

By way of example and not by way of limitation, in a retail business with multiple departments and cashier locations, it may be critical to listen to calls placed on a customer service phone or to monitor cash register locations to listen for indicators of customer displeasure that could result in lost sales. Immediate identification of certain phrases and the location at which the comment is made may allow management intervention to save a sale and a customer relationship. In centralized call centers, new employee training and quality control may be accomplished by having supervisors listen in to customer calls that a new employee is handling. This call-listening method permits a supervisor to directly monitor one employee and try to model that employee's behavior to meet standards. Apparatus 10 may permit a supervisor to effectively monitor numerous training situations by monitoring numerous calls to identify those calls in which a new employee is acting outside previously established call models. When apparatus 10 indicates that a new employee is acting outside established call models, management may timely intervene as appropriate.

In a government agency with security responsibilities, it may be critical to categorize a call being monitored as requiring immediate management intervention if a threatening phrase were heard. Immediate management intervention may permit relation of the call to other data such as point of origin, caller identification and other events that could indicate intent by the caller to act. Organizations may not be staffed at a level that allows sufficiently timely review of voice messages by trained operators or managers to assure prompt and appropriate action. Voice messages may not be reviewed until well after they have been recorded so that it may be impossible to take timely action to resolve critical situations. Apparatus 10 may create associations between entities (e.g., words, phrases and sounds) that exist in sentences within audio segments. Apparatus 10 may count each occurrence of each particular entity. Apparatus 10 may further present, for a given entity, a rank-ordered list of all other entities that are associated with the given entity being examined. Apparatus 10 may relate the entities found and the frequency of occurrence of the found entities to predetermined standards to determine proper category and priority of an examined audio segment and to alert management to effect immediate intervention as appropriate.

Apparatus 10 may permit near-real time analysis of audio segments so as to enable immediate manager action to preclude negative impacts of extant audio communications. Apparatus 10 may avoid a "key word or key phrased" based approach that requires precise queries or rules to exactly describe what causes a particular classification of an audio communication segment. The memory based approach employed by apparatus 10 may permit apparatus 10 to merely inquire for other audio communications "like this" to categorize an extant audio communication segment without having to not know exactly why the extant audio communication is significant.

Figure 2:
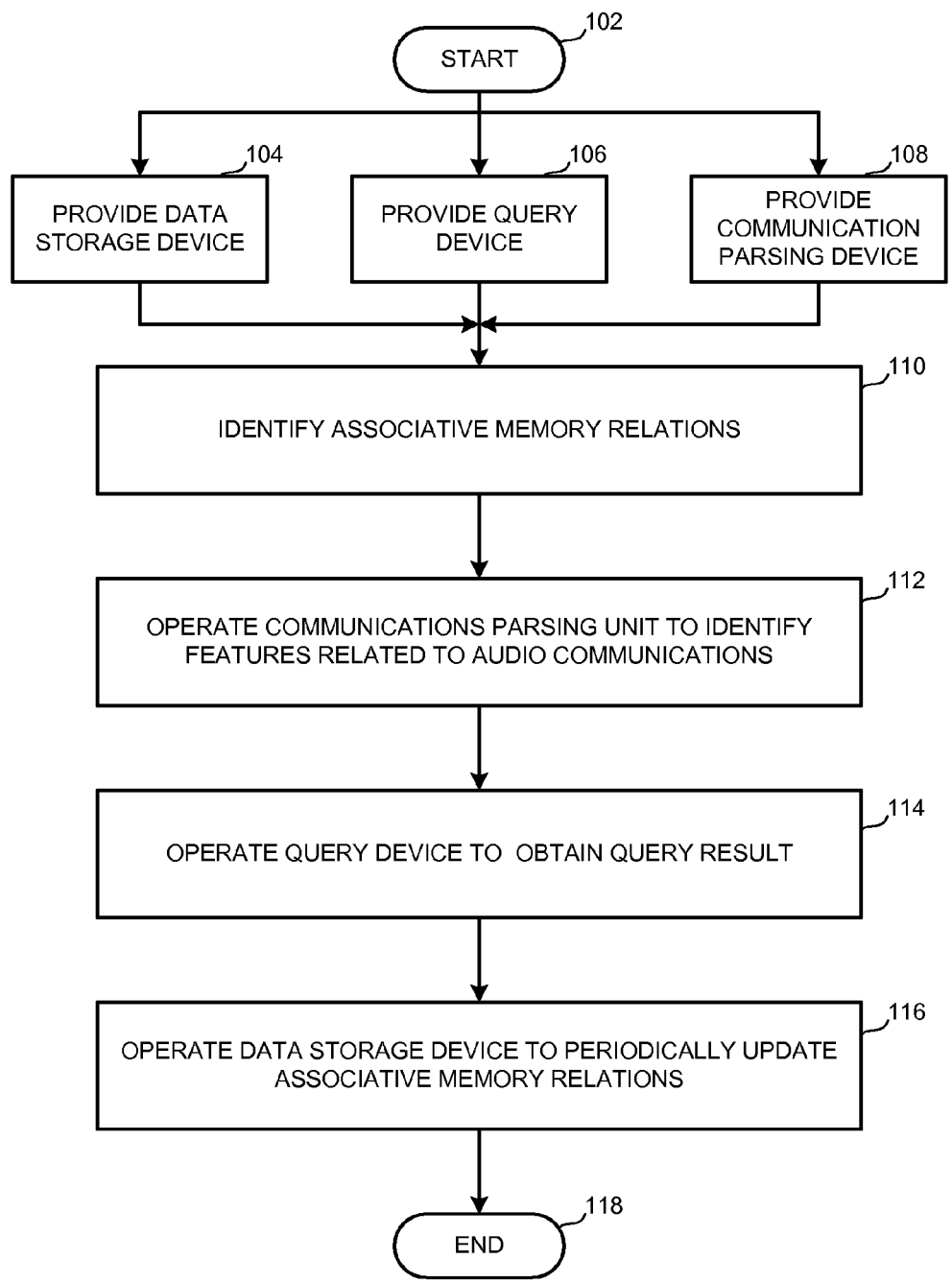
FIG. 2 is a flow chart illustrating an embodiment of the method of the invention.

FIG. 2 is a flow chart illustrating an embodiment of the method of the invention. In FIG. 2, a method 100 for evaluating audio communications may begin at a START locus 102. Method 100 may continue by, in no particular order: (1) providing a data storage device, as indicated by a block 104; (2) providing a query device coupled with the data storage device, as indicated by a block 106; and (3) providing a communications parsing unit coupled with at least one of the data storage device and the query device, as indicated by a block 108.

Method 100 may continue by identifying associative memory relations among information aspects stored in the data storage device, as indicated by a block 110. Method 100 may continue with operating the communications parsing device to receive the audio communications and to effect identification of features related with the audio communications, as indicated by a block 112. The features related with the audio communications may be available for inclusion among the information aspects. Method 100 may continue by operating the query device to pose queries relating to at least one of the information aspects and the associative memory relations to obtain at least one query result, as indicated by a block 114. Method 100 may continue by operating the data storage device to periodically effect updating of the associative memory relations, as indicated by a block 116. Method 100 may terminate at an END locus 118.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. Apparatus for evaluating an audio communication, comprising:
   a data store for storing a plurality of digital units representing a plurality of characterized aspects of historical audio communications, the characterized aspects including words and sets of words;
   an associative memory unit coupled with the data store to create associations between entities representing the characterized aspects, and relate the entities and the frequency of occurrence of the entities to identify relationships with call handling categories and priorities requiring intervention; and
   an assessing unit coupled with the associative memory unit to indicate whether the audio communication contains any associative memory associations related to a call handling category and call handling priority requiring intervention.

2. The apparatus of claim 1, further comprising a user review unit for reviewing the audio communication if the assessing unit indicates that intervention in handling an audio communication is required.

* * * * *